united States Patent Office 3,206,479
Patented Sept. 14, 1965

3,206,479
PRODUCTION OF ETHER-ESTERS OF TETRA-HYDROPYRAN-2-CARBOXYLATES
Karl J. Sax, Tappan, N.Y., assignor to Shell Oil Company, New York, N.Y., a corporation of Delaware
No Drawing. Filed Mar. 15, 1962, Ser. No. 180,011
4 Claims. (Cl. 260—345.8)

This invention relates to the synthesis of esters of tetra-hydropyran-2-carboxylic acids which have an ether group attached to the 6-position of the tetrahydropyran ring. It deals with a new method of producing ether-substituted esters of this type more economically and efficiently than has been feasible by prior methods of synthesis.

Ether-substituted tetrahydropyran - 2 - carboxylic acid esters have many useful properties which make them desirable compounds for a variety of applications in the resin and surface coating fields and for use as intermediates in the production of useful derivatives, especially epoxy derivatives of the ethylenic ether-esters. In spite of this, there has been little or no commercial use of compounds of this type because of their high cost. This high cost has been due to the fact that the synthesis of these compounds has required expensive starting materials and/or complicated procedures.

An important object of the present invention is the provision of a simple single step process whereby ether-esters of tetrahydropyran-2-carboxylic acid can be produced economically and efficiently. A more specific object is the provision of a method of directly converting 3,4-dihydro-2H-pyran-2-carboxylic acid salts to ether-esters at relatively low cost. Other objects and advantages of the invention will be apparent from the following description of the new process in some of its especially advantageous applications which are intended to be illustrative only and not restrictive of the invention.

In accordance with the invention, ether-substituted tetra-hydropyran-2-carboxylic acid esters are produced by reacting a salt of a 3,4-dihydro-2H-pyran-2-carboxylic acid with an alcohol of 1 to 18 carbon atoms per molecule in the presence of an acid sufficiently stronger than said dihydro-2H-pyran-2-carboxylic acid to react with the anion of said salt.

The process can be used successfully with any 3,4-dihydro-2H-pyran carboxylic acid salt of the formula

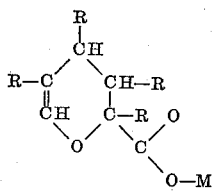

where each R represents a member of the group consisting of hydrogen and lower alkyl groups, that is alkyl groups of 1 to 5 carbon atoms, and M represents the salt-forming cation. U.S. Patent No. 2,479,283 describes suitable methods for producing salts of this type which are useful starting materials for the new process. Typical examples of 3,4-dihydro-2H-pyran-2-carboxylic acids whose salts can be used in making corresponding ether-esters according to the invention are: 3,4-dihydro-2H-pyran-2-carboxylic acid; 3-methyl-3,4-dihydro-2H-pyran-2-carboxylic acid; 4-methyl-3,4-dihydro-2H-pyran-2-carboxylic acid; 2,5-di-methyl-3,4-dihydro-2H-pyran-2-carboxylic acid; 5-methyl-3,4-dihydro-2H-pyran-2-carboxylic acid; 3,4-diethyl-3,4-dihydro-2H-pyran-2-carboxylic acid; 4-methyl-5-normal propyl-3,4-dihydro-2H-pyran-2-carboxylic acid; 2,4-diethyl-5-normal propyl - 3,4 - dihydro - 2H-pyran-2-carboxylic acid; 3,4,5-triisopropyl-3,4-dihydro-2H-pyran-2-carboxylic acid; 2,3,4,5 - tetramethyl - 3,4-dihydropyran-2-carboxylic acid; and 2,3-dimethyl-4,5-diethyl-3,4-dihydro-2H-pyran-2-carboxylic acid.

Any salt of the foregoing dihydropyran-2-carboxylic acids can be used in the new process. For reasons of economy, it is usually advantageous to use inorganic salts, preferably alkali metal salts of which sodium, potassium and lithium salts are examples, or ammonium salts. Alkaline earth metal salts such as magnesium, calcium, barium and strontium are also particularly useful in the process. Other usable inorganic salts include copper, mercury, silver, cadmium, and similar salts. Organic salts such as amine salts can also be used, examples being salts of the mono-, di- and tri-alkyl amines such as mono-methyl amine, diethyl amine, triethyl amine, methyl ethyl amine, dimethyl propyl amine, cyclohexyl amine, and the like. Preferred amine salts are those containing 1 to 6 carbon atoms per molecule, especially the lower alkyl amine salts. The salts used are preferably simple normal salts but where salts of multivalent cations are employed one can use mixed salts instead of simple salts. Thus, for example, calcium dihydropyran-2-carboxylate acetate can be used instead of calcium di(dihydropyran-2-carboxylate). Basic salts such as basic magnesium di-hydropyran-2-carboxylate, etc., can likewise be used in place of the normal salts although the latter are generally more advantageous starting materials for the process.

The alcohols which can be successfully reacted with the foregoing dihydropyran-2-carboxylic acid salts can be aliphatic, cycloaliphatic or aromatic alcohols. Typical of the alcohols which are suitable in the process are, for example, saturated monohydric alcohols such as methyl, ethyl, normal and isopropyl; normal, secondary, and isobutyl, the amyl, octyl, dodecyl, octadecyl and like alcohols; cycloalkanols such as cyclohexanol, 4-methyl-cyclohexanol, etc.; aromatic alcohols, as benzyl alcohol, and the like; unsaturated alcohols such as allyl, methallyl, crotyl, and oleyl alcohols and the like. Preferred alcohols are those composed of carbon, hydrogen and the hydroxyl oxygen atoms, an especially advantageous subgroup of alcohols of this kind being the monohydric alcohols of 1 to 5 carbon atoms. It is feasible, however, to use alcohols which contain in the molecule substituent atoms or groups which do not interfere with the reaction. Substituents of this kind are, for instance, halogen atoms, particularly chlorine atoms, carbonyl groups, including ketone and/or carboxyl groups, ester and ether groups, etc.

Preferred acid catalysts for use in the process are those having a dissociation constant for the first hydrogen greater than about $1.0 \times 10^{-2}$ at 25° C. As a general rule inorganic acids are most advantageous because they have less tendency to cause side reactions and are, in many cases, available at low cost. Preferred acids are hydrogen chloride, sulfuric acid, phosphoric acid, and acids of similar strength, but sulfonic acids such as benzene and toluene sulfonic acids and the like can also be used.

The reaction is desirably conducted under substantially anhydrous conditions such as can be realized by the use of starting materials which contain not more than about 1% weight of water. It is not essential that the reactants be mutually soluble since successful reults have been obtained with reaction mixtures containing a plurality of phases. However, one can employ an inert mutual solvent for the reactants and carry out the process in a homogenous liquid phase. Suitable reaction media are, for instance, ketones such as acetone, halohydrocarbons such as chloroform, hydrocarbons such as benzene and ethers such as diethyl ether.

As a general rule it is advantageous to employ a stoichiometric excess of alcohol to starting dihydropyran-2-carboxylic acid salt. Proportions of the order of about 2 to about 25 moles of monohydric alcohol per mole of dihydropyran-2-carboxylic acid salts are generally suitable but higher or lower ratios are also operative. Generally amounts of acid within the range of about 0.5 to 2 equivalents per mole of salt of the dihydropyran-2-carboxylic acid will be used. More preferably the acid is used in an amount about equivalent to the salt of the dihydropyran-2-carboxylic acid which is employed. Larger amounts of acid can be employed although they usually offer no advantage. Smaller amounts of acid are also operative in the process but are less desirable because they result in incomplete reaction of dihydropyran-2-carboxylic acid salt. The reaction is preferably carried out at a temperature in the range of about $-10°$ to about $50°$ C., more advantageously between $0°$ to about $30°$ C. Under these conditions, the reaction is substantially complete in about 2 to about 24 hours, but longer or shorter times can be used, although generally times of about one half to about 48 hours will be preferable.

Any suitable method for bringing the reactants into intimate contact with each other can be used. One convenient method of batch operation comprises admixing the chosen dihydropyran-2-carboxylic acid salt and alcohol and then introducing the required amount of acid while stirring and controlling the temperature to avoid excessive increase due to the exothermic nature of the reaction. After completion of the acid addition the reactants can be left in contact with each other until substantial completion of the reaction. Alternatively the reaction can be carried out continuously, as for instance, by pumping the dihydropyran-2-carboxylic acid salt and alcohol into a reaction coil provided with a cooling jacket and introducing the acid at one or more points into the mixture as it flows through the coil for the time required for reaction.

The ether-substituted tetrahydropyran-2-carboxylic acid ester which is produced can be recovered in different ways. One convenient method comprises dilution with water and solvent extraction followed by evaporation of the extract and distillation of the product preferably under reduced pressure.

EXAMPLE I

Methyl 6-methoxytetrahydropyran-2-carboxylate

A suspension of 25 g. of sodium 3,4-dihydro-2H-pyran-2-carboxylate in 100 ml. of methanol was treated with 7 g. of anhydrous hydrogen chloride during cooling in an ice bath. The mixture was allowed to stand at room temperature for several hours. Five g. of magnesium sulfate was added and the mixture was allowed to stand overnight. After filtration, the solution was concentrated in vacuum to remove excess methanol. The residue was poured into water and the aqueous solution was extracted four times with ether. The combined ether extract was washed with a small amount of water, dried over magnesium sulfate and filtered. The ether was evaporated and the methyl 6-methoxytetrahydropyran-2-carboxylate produced, 18.3 g. 63% yield, B.P. 93–95°/7.5 mm., $n_D^{22}$ 1.4447 (last drop), was distilled. Equivalent weight by hydrolysis was 171.

*Analysis.*—Calcd. for $C_8H_{14}O_4$ (174.2): C, 55.2; H, 8.1. Found: C, 55.2; H, 8.1.

Twenty grams of the product was treated with 30 ml. of concentrated ammonium hydroxide. The mixture became a solution during warming. Within five minutes a solid precipitated. After one-half hour the solid cake was slurried with water and isopropyl alcohol and filtered to give 12 g., M.P. 157.5–158.5°. Recrystallization from water gave 9 g. of 6-methoxytetrahydropyran-2-carboxamide, M.P. 156–159. The product appeared to hydrolyze slowly in boiling water.

*Analysis.*—Calcd. for $C_7H_{13}O_3N$ (159.2): C, 52.81; H, 8.23; N, 8.80. Found: C, 52.85; H, 8.26; N, 8.66.

EXAMPLE II

Ethyl 6-ethoxytetrahydropyran-2-carboxylate

A suspension of 160 g. of sodium 3,4-dihydro-2H-pyran-2-carboxylate in 400 ml. of anhydrous ethanol was treated with 41 g. of anhydrous hydrogen chloride during cooling and stirring in an ice-bath. As the excess hydrogen chloride was added the reaction became quite exotheric. One hundred grams of magnesium sulfate was added and the mixture was allowed to stand overnight. The suspension was filtered; the filtrate was concentrated in vacuum, and poured into 1 liter of water. The product was not as soluble as the corresponding methyl ester. It was extracted with 1 liter of ether in three portions. The ether extract was dried over magnesium sulfate, filtered and distilled. The ethyl 6-ethoxytetrahydropyran-2-carboxylate product was collected in three fractions: (1) B.P. 101/5.5 mm., 9.9 g., $n_D^{21}$ 1.4408; (2) B.P. 101/5.5–104/5.0 mm., 140.1 g., $n_D^{21}$ 1.4467; (3) B.P. 103–101/5.0 mm., 25.4 g., $n_D^{21}$ 1.4413. A considerable portion of the residue represents column holdup. The three distilled fractions amount to 86% of theory.

About 0.5 g. of the ethyl 6-ethoxytetrahydropyran-2-carboxylate was treated with 1 ml. of concentrated ammonium hydroxide. The reaction was quite slow compared to that of the methoxy methyl ester. On standing overnight crystals of 6-ethoxytetrahydropyran-2-carboxamide separated and were collected, M.P. 120–121°.

A mixture of 24 g. (0.12 mole) of ethyl 6-ethoxytetrahydropyran-2-carboxylate, 50 ml. of ethanol and 16 g. (0.5 mole) of hydrazine was refluxed for one-half hour. The mixture was cooled and, since no product crystallized, distilled to give 19 g. of 6-ethoxytetrahydropyran-2-carboxylic acid hydrazide, B.P. 103–110°/1 mm., $n_D^{20}$ 1.4898.

*Analysis.*—Calcd. for $C_8H_{16}O_3N_2$ (188.2): C, 51.1; H, 8.6; N, 14.9. Found: C, 50.9; H, 8.6; N, 15.0.

EXAMPLE III

Allyl 6-allyloxytetrahydropyran-2-carboxylate

A suspension of 40 g. of sodium 3,4-dihydro-2H-pyran-2-carboxylate in 150 ml. of allyl alcohol was treated with 9.5 g. of anhydrous hydrogen chloride during cooling. The mixture was allowed to stand at room temperature overnight. It was diluted with water and extracted with ether. The ether extract was dried over magnesium sulfate, filtered, and distilled to yield 34.5 g. of allyl 6-allyloxytetrahydropyran-2-carboxylate, B.P. 108°/4 mm.

*Analysis.*—Calcd. for $C_{12}H_{18}O_4$ (226.3): C, 63.7; H, 8.0. Found: C, 63.7; H, 7.9.

Five grams of the above ester was refluxed for two hours with 35 ml. of concentrated ammonium hydroxide solution. The clear solution was concentrated and cooled. Damp product, 4.8 g., M.P. 70–72°, was collected. On attempted recrystallization from methanol-water, it was found that most of the methanol had to be removed before the product crystallized. Only 0.46 g. of solvated material, M.P. 70–75° was recovered. Two crystallizations from acetone-petroleum ether gave 0.28 g. of 6-allyloxytetrahydropyran-2-carboxamide, M.P. 105°.

*Analysis.*—Calcd. for $C_9H_{15}O_3N$ (185.2): N, 7.56. Found: N, 7.55.

Using the method of the foregoing examples one can similarly react potassium 3-methyl-3,4-dihydro-2H-pyran-2-carboxylate with isopropyl alcohol and obtain isopropyl 6-isopropoxy-2-methyltetrahydropyran-2-carboxylate; sodium 2,5 - dimethyl - 3,4-dihydro-2H-pyran-2-carboxylate with 2-ethylhexanol to produce 2-ethylhexyl 6-(2′ethyl)-hexyloxy-2,5-dimethyltetrahydropyran-2 - carboxylate; potassium 5 - methyl - 3,4-dihydro-2H-pyran-2-carboxylate with cyclohexanol to make cyclohexyl 6-cyclohexyloxy-5-methyltetrahydropyran - 2 - carboxylate and 3,4-dihydro-2H-pyran-2-carboxylic acid calcium salt with benzyl alcohol to obtain benzyl 6-benzyloxytetrahydropyran-2-carboxylate.

The ether-ester products of the invention are useful intermediates for the preparation of other valuable compounds, especially novel amides such as those shown in Examples I, II and III, which can be employed as additives for improving the anti-wear properties of lubricating oils and as plasticizers for resins. The 6-alkyleneoxytetrahydropyran-2-carboxamides, like the alkylene 6-alkyleneoxytetrahydropyran-2-carboxylates, can be epoxidized by reaction with peracetic acid or like epoxidizing agent to convert the ethylenic group or groups to epoxy groups,

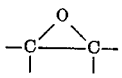

and to obtain compounds which are advantageous stabilizers for polyvinyl chloride resins, and can be used in making epoxy type resins from polyglycidyl ethers, for instance. U.S. Patent 2,870,166, for example, describes suitable methods for carrying out the epoxidation.

The ether-substituted tetrahydropyran-2-yl carboxylic acid esters can be subjected to transesterification under basic conditions using a different alcohol from that employed in their initial preparation when the intended use makes it desirable to have a different alcohol moiety in the ester group from that in the ether group. The transesterification is advantageously carried out with a substantial excess of the alcohol to be exchanged, for example, about 5 to 20 moles per mole of starting ether-substituted tetrahydropyran - 2 - yl carboxylate. A small amount of alkali metal alkoxide is suitable as catalyst, for instance sodium or potassium alkoxide corresponding to the alcohol to be exchanged. When using a low boiling primary alcohol for the reaction one can operate at ambient temperature, for example. But when replacing a low boiling alcohol by one of higher boiling point it is often advantageous to use a temperature at which the lower boiling alcohol can be distilled off as it is liberated from the ester. Using such methods of operation one can produce ether-substituted esters having alkyl groups of different chain lengths, or different substituents or different degrees of unsaturation in the ether and ester groups. For instance, the methyl 6-methoxytetrahydropyran-2-carboxylate of Example I can be reacted with lauryl alcohol to produce lauryl 6-methoxytetrahydropyran-2-carboxylate, or with glycerol to make 6-methoxy-tetrahydropyran-2-carboxylic acid mono-, di- and/or triglycerides depending on the proportions of glycerol to ester which are used. Similarly allyl 6-allyloxytetrahydropyran-2-carboxylate of Example III can be reacted with methyl isobutyl carbinol to obtain 1,3-dimethyl-butyl 6-allyloxytetrahydro-2-carboxylate.

It will thus be seen that the new process offers many advantages and is capable of extensive variation, not only with respect to the salts of dihydropyran-2-carboxylic acids and the alcohols which can be reacted together, but also in regard to the method of operation employed in effecting the reaction. The invention is therefore not restricted to the examples which have been given by way of illustration nor by any theory proposed in explanation of the improved results which are obtained.

I claim as my invention:

1. A process for producing an ether-substituted ester of the formula

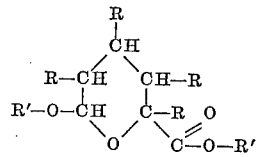

which comprises reacting a 3,4-dihydro-2H-pyran-2-carboxylic acid salt of the formula

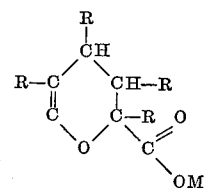

with an alcohol of the formula R′—OH under substantially anhydrous conditions at a pH less than 7 in the presence of about 0.5 to 2 equivalents of an acid stronger than said dihydropyran carboxylic acid per mole of said salt, R in the foregoing formulas representing a member of the group consisting of hydrogen and lower alkyl, while R′ represents the radical of an alcohol of 1 to 5 carbon atoms composed of carbon, hydrogen and hydroxyl oxygen and M is the cation of a salt of the 3,4-dihydro-2H-pyran-2-carboxylic acid of the group consisting of inorganic and amine salts.

2. A process for producing methyl 6-methoxy-tetrahydropyran-2-carboxylate which comprises reacting methanol and sodium 3,4-dihydro-2H-pyran-2-carboxylate in a mole ratio of about 2:1 to about 25:1 under substantially anhydrous conditions in the presence of about 0.5 to 2 equivalents of hydrogen chloride per mole of said salt at about —10° to about 50° C.

3. A process for producing allyl 6-allyloxytetrahydropyran-2-carboxylate which comprises reacting allyl alcohol and sodium 3,4-dihydro-2H-pyran-2-carboxylate in a mole ratio of about 2:1 to about 25:1 under substantially anyhydrous conditions in the presence of about 0.5 to 2 equivalents of hydrogen chloride per mole of said salt at about —10° to about 50° C.

4. A process which comprises admixing under substantially anhydrous conditions an alkali metal salt of 3,4-dihydro-2H-pyran-2-carboxylic acid having no alkyl group of more than 5 carbon atoms with a stoichiometric excess of monohydric saturated aliphatic alcohol of 1 to 5 carbon atoms composed only of carbon, hydrogen and hydroxyloxygen and about 0.5 to 2 equivalents of a strong inorganic acid per mole of said salt while maintaining the mixture at about —10° to about +50° C. until substantial production of alkyl 6-alkoxytetrahydropyran-2-carboxylate has taken place.

References Cited by the Examiner

UNITED STATES PATENTS

| | | | |
|---|---|---|---|
| 2,514,172 | 7/50 | Whetstone et al. | 260—345.8 |
| 2,574,444 | 11/51 | Whetstone | 260—345.8 |
| 2,931,837 | 4/60 | Stansbury et al. | 260—345.9 X |

OTHER REFERENCES

Fieser et al.: Organic Chemistry, page 165, 3d edition, D. C. Heath and Co., Boston (1958).

Noller: Chemistry of Organic Compounds, page 170, W. B. Saunders Co., Philadelphia (1957).

Schmidt: Organic Chemistry, pages 219–222, 7th edition, Oliver and Boyd, London (1955).

WALTER A. MODANCE, *Primary Examiner.*

IRVING MARCUS, NICHOLAS S. RIZZO,
*Examiners.*